United States Patent Office 2,752,398
Patented June 26, 1956

2,752,398

COLOR STABILIZATION OF PHENOLS WITH PHOSPHORIC ACIDS

Horace E. Riley, Verona, N. J., assignor to Union Carbide and Carbon Corporation, a corporation of New York No Drawing. Application June 23, 1953,
Serial No. 363,665

6 Claims. (Cl. 260—624)

This invention relates to the inhibition of color changes in phenols occurring in storage in metal containers. More particularly, the invention relates to inhibiting color changes in phenols particularly on storage in a hot, liquid condition by incorporating in the phenol a small amount of a phosphoric acid.

Heretofore it has been proposed to produce phenols of light color by distilling the phenol through glass, tin or chromium surfaced condensers whereby it was possible to obtain in many instances phenols of water-white color in the liquid state or white crystals when solidified. However, such distillation equipment is expensive and the initial light color of the distillate darkened more or less rapidly on storage, particularly in iron containers.

It has also been proposed to add as color inhibitors to phenol, such substances as stannous chloride and sulphurous acid, but sulfurous acid has been found to introduce a greenish color to phenols, and both sulfurous acid and stannous chloride have objectionable catalytic effects when such inhibited phenols are condensed with aldehydes or ketones to form phenolic resins.

According to my invention a small amount of a phosphoric acid added as such or as an aqueous solution to a phenol, preferably immediately after the phenol has been distilled, is highly effective in inhibiting a change in color of the phenol for as much as six months, even under such extreme storage conditions as being held in a molten state and in iron or steel containers. Preferably, the amount of phosphoric acid used corresponds to between 0.1 and 0.001% by weight of the phenol. These minute amounts of phosphoric acid are surprisingly effective in suppressing color formation in the phenol, and furthermore their presence is comparatively innocuous as regards subsequent use of the phenol, particularly in condensation reactions with aldehydes or ketones to form resins.

The incorporation of a phosphoric acid, namely orthophosphoric acid, meta-phosphoric acid or pyro-phosphoric acid, to stabilize color development in a phenol is effective with all phenols of synthetic or natural origin which when in contact with air or metallic surfaces, particularly iron tend to darken in color. Such phenols include the monohydric phenols, for example phenol, its alkyl homologues, such as the isomeric cresols and xylenols, monobutyl phenols and dibutyl phenols, the isomeric amyl phenols such as para tertiary amyl phenol, the isomeric octyl phenols as for instance, para tertiary octyl phenol, fused ring phenols such as the naphthols, methylene linked diphenylols as represented by the 2,2'-, 2,4'- and 4,4'-isomeric dihydroxy diphenyl methanes and 4,4'-dihydroxy dimethyl diphenylmethane, and the polyhydric phenols as typified by resorcinol, pyrogallol and hydroquinone.

Typical color stabilization effects obtained by incorporating a phosphoric acid in a phenol are shown in the following examples.

*Example 1*

Phenol ($C_6H_5OH$) was distilled at atmospheric pressure using a glass still and condenser to yield a distillate of water-white color. The distillate was collected in two clean glass bottles one to serve as a blank and the other being inhibited by the addition of an amount of orthophosphoric acid equivalent to 0.01% by weight of the phenol. Each bottle was only partly filled to provide an air space over the top of the phenol. There was then placed in each bottle a sheet of low carbon steel having a surface area in contact with the phenol of approximately twice the area normally exposed per unit volume of the phenol under normal commercial storage conditions in iron tanks or drums. The two bottles were then placed in an oven held at a temperature of 65° C. Periodically samples were withdrawn from each bottle and diluted with 10% by weight of distilled water to form a solution which would remain liquid at room temperature and thereby facilitate color measurements. To measure the color change use was made of the Gardner 1933 Color Standards, described in "Gardner-Sward Physical and Chemical Examination of Paints, Varnishes, Lacquers and Colors," page 94, 11th edition, 1950. A water-white color is defined as not darker than the No. 1 Gardner color tube; successively higher color numbers represent progressively darker colors being from yellow to amber and to brown colors respectively. At the start of the 65° C. oven ageing test, both samples of phenol had a Gardner color of less than one, but after 20 days ageing the uninhibited control sample of phenol had darkened severely to a Gardner color of 7. The sample containing the phosphoric acid maintained consistently a color of less than one Gardner for six months at 65° C. whereupon the test was discontinued.

That mineral acids other than phosphoric acid are generally ineffective as color inhibitors for phenol was demonstrated by adding various mineral acids such as hydrochloric acid, sulphuric acid, and nitric acid to distilled phenol and then determining their effect in the same manner as described in Example 1. With 0.01% of hydrochloric acid or 0.01% of nitric acid phenol darkened severely to a Gardner color, between 11 and 12 after only a day's exposure to a temperature of 65° C. With 0.01% of sulphuric acid, phenol darkened to a Gardner color between 2 and 3 after 24 hours at 65° C.

*Example 2*

Para-tertiary-butyl phenol was freshly distilled into a glass bottle and while still molten a quantity of orthophosphoric acid equivalent to 0.1% by weight of the para-tertiary butyl phenol was added and mixed therewith. A sheet of low carbon steel was placed in the bottle in such manner that the phenol was in contact with an area of the steel sheet twice that per unit volume of phenol normally encountered when the phenol is stored in steel or iron tanks and drums. The bottle was loosely stoppered and then placed in an oven maintained at a temperature of 115° C. A control sample of freshly distilled but uninhibited para-tertiary-butyl phenol and in contact with a steel panel was also placed in the oven at the same time. At the start of the test, both samples of para-tertiary butyl phenol had a Gardner color of less than 1. The uninhibited para-tertiary-butyl phenol after 10 days at 115° C. had a Gardner color of 4; and after 30 days its color had darkened further to a Gardner color of 9. In contrast, the phosphoric acid containing para-tertiary-butyl phenol after 30 days at a temperature of 115° C. still had a Gardner color of less than one.

The small amount of phosphoric acid required to effect a satisfactory degree of color inhibition is also of advantage in preventing corrosion of metal containers in which the phenol is stored, particularly when the phenol is contaminated with water. Measurements of weight gain or loss of the steel panels immersed in the phosphoric acid inhibited para-tertiary-butyl phenols of Example 2 showed a negligible weight loss of 1.3 milligram per 70 sq. cm. of steel surface after 20 days at 115° C.

In the preferred range of about 0.1 to 0.001% by weight of phosphoric acid on the weight of phenol, there occurs some change in pH value from the normal pH value of uninhibited phenol. However, the slightly more acid pH value resulting from the addition of a phosphoric acid has not been found to effect in any material manner the rate at which such inhibited phenols condense with aldehydes such as formaldehyde or the properties of the resultant condensates. The pH values of various uninhibited phenols and of the same phenols inhibited with different amounts of ortho phosphoric acid are tabulated below. The pH values were determined at 25° C. on aqueous solutions containing 5 cc. of phenol and 95 cc. of distilled water in the instance of phenol and commercial tar acids, and of 5 cc. molten phenol dissolved in 100 cc. of a solution consisting of equal parts by weight distilled water and ethyl alcohol in the instance of para-tertiary butyl phenol, such aqueous solutions being used to facilitate the taking of these measurements.

| | Wt. Percent Phosphoric Acid | pH Value |
|---|---|---|
| Phenol ($C_6H_5OH$) | none (uninhibited) | 5.3 |
| | 0.001% | 3.65 |
| | 0.01% | 3.45 |
| | 0.1% | 3.35 |
| Para-tertiary-butyl phenol | None (uninhibited) | 7.15 |
| | 0.01% | 5.6 |
| Commercial tar acids [1] | None (uninhibited) | 4.8 |
| | 0.001% | 4.7 |
| | 0.01% | 4.65 |
| | 0.1% | 4.35 |

[1] Mixture of phenol, isomeric cresols, and isomeric xylenols.

While it is preferable to add the phosphoric acid to a phenol immediately after it has been distilled for the purpose of securing not only the lightest possible color in the phenol, but also of maintaining such color for long periods of time, it has been found that phenols already discolored before the phosphoric acid is added thereto may nevertheless be stabilized by a phosphoric acid against further color development.

What is claimed is:

1. An alkyl substituted phenol containing between about 0.1% and 0.001% by weight of a phosphoric acid as an inhibitor of color darkening on storage.

2. A phenol in admixture with between about 0.1 and 0.001% by weight of a phosphoric acid.

3. Phenol ($C_6H_5OH$) in admixture with between about 0.1 and 0.001% by weight of ortho-phosphoric acid.

4. Para-tertiary-butyl phenol in admixture with between about 0.1 and 0.001% by weight of ortho-phosphoric acid.

5. Method of inhibiting discoloration of a phenol on storage in a molten condition and in contact with iron surfaces, which comprises incorporating in the phenol between about 0.1% and 0.001% by weight thereof of a phosphoric acid.

6. Method of inihibiting discoloration of a phenol during storage which comprises distilling the phenol and then incorporating in the distilled phenol between 0.1% and 0.001% by weight of a phosphoric acid.

References Cited in the file of this patent
UNITED STATES PATENTS 2,383,279     Stillson et al. _____ Aug. 21, 1945

OTHER REFERENCES

Hart et al.: Jour. Organic Chem., vol. 15 (March 1950), page 399.